July 2, 1963 A. TARAS 3,096,511

APPARATUS FOR EFFECTING CONCURRENT RECORD, READ AND CHECKING OPERATIONS

Filed Feb. 25, 1959

INVENTOR

Andrew Taras

United States Patent Office 3,096,511

Patented July 2, 1963

3,096,511

APPARATUS FOR EFFECTING CONCURRENT RECORD, READ AND CHECKING OPERATIONS

Andrew Taras, Binghamton, N.Y., assignor to International Business Machines Corporation, New York, N.Y., a corporation of New York Filed Feb. 25, 1959, Ser. No. 795,376

5 Claims. (Cl. 340—174.1)

The invention relates to magnetic recording and reading apparatus and, more particularly, to an arrangement for concurrently reading information as it is being recorded.

An object of the invention resides in an arrangement of a reading head and a recording head with a magnetizable recording medium whereby a recording and a reading operation are concurrently effected on the same bit of information.

Another object of the unique arrangement provides for concurrent checking and recording of the same data.

Other objects of the invention will be pointed out in the following description and claims and illustrated in the accompanying drawings, which disclose, by way of examples, the principle of the invention and the best mode, which has been contemplated, of applying that principle.

Figure 1:
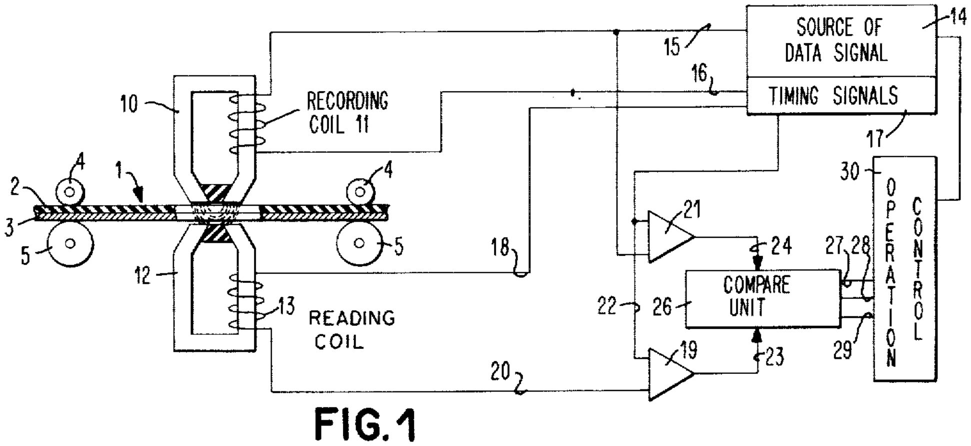
FIG. 1 is a diagrammatic illustration of an arrangement in accordance with the invention.

Referring to FIG. 1, there is shown a magnetizable medium 1 having a base region 2 bearing a magnetizable layer 3. The base 2 may be Mylar, paper, or any other substance which is capable of bearing or supporting the magnetizable layer 3. The medium may be in the form of a tape, disc, a curved surface, or it may take the form of a magnetizable metal tape. In the embodiment shown, the medium 3 is adapted to be moved under control of driving rollers 4 and 5, in turn driven by suitable drive means, not shown. Cooperating with the medium 3 is a recording head 10 threaded with a recording coil 11; the latter, when energized by data signals, causes the head 10 to record magnetic impressions on the medium. The head 10 is provided with adjusting means, not shown, adapted to position the head 10 with respect to the medium layer 3. A reading head 12 is positioned in magnetic relationship to said medium. Although this magnetic relationship may be achieved from various physical relationships of the associated elements, the most practical one is achieved by positioning the read head on the opposite side of the medium layer 3. Suitable adjusting means, not shown, are provided to enable the reading head 12 to be positioned to an optimum signal reading position with respect to the magnetic impressions on the medium and the recording head 10. It may be appreciated that, in order to attain the optimum in signal reading conditions and magnetic coincidence condition, consideration must be given to the character and condition of the medium, the gap size between the heads, the common axis of maximum magnetization with respect to both heads, and the selection of the medium surface for cooperation with one or the other of the two heads for the most desirable flux linking paths.

The recording coil 11 is connected to a source of data signals 14 by way of a line 15 and to a source of coordinating timing signals 17 by way of a line 16. A reading coil 13 threads the reading head 12 and is connected by way of a line 18 to the coordinating timing signals 17 and to a switching device 19 by way of a line 20. The signals applied to the recording head are also applied to a switch 21. Both switches 19 and 21 are gated at the same time by means of a sample gate signal **22*a* issued from the timing means 17 to the switches 19 and 21 by way of a line 22. The timing relationships of the sample signal 22*a*, recording data signals 10*a* and recorded signals 12*a*, read from the medium, are shown in the time chart of FIG. 2. When the switches 19 and 21 respond to the applied data and sample signals, they both issue signals concurrently on the output lines 23 and 24; both connected to a comparing unit 26 having three output lines 27, 28 and 29, which output lines are merely exemplary since any desired outputs or combinations thereof may be derived from the comparing unit depending upon the requirements of the system. The line 27 provides an output when incoming signals are present on one of the two input lines 23 and 24. The line 28 issues an output whenever signals are absent from both lines 23 and 24, and the line 29 issues an output each time signals appear on the lines 23 and 24. The output lines 27, 28 and 29 are connected to an operation control unit 30 which may be used to continue or disable the recording operating depending upon the nature of the output signals issued by the comparing unit 26**.

Figures 2, 3:
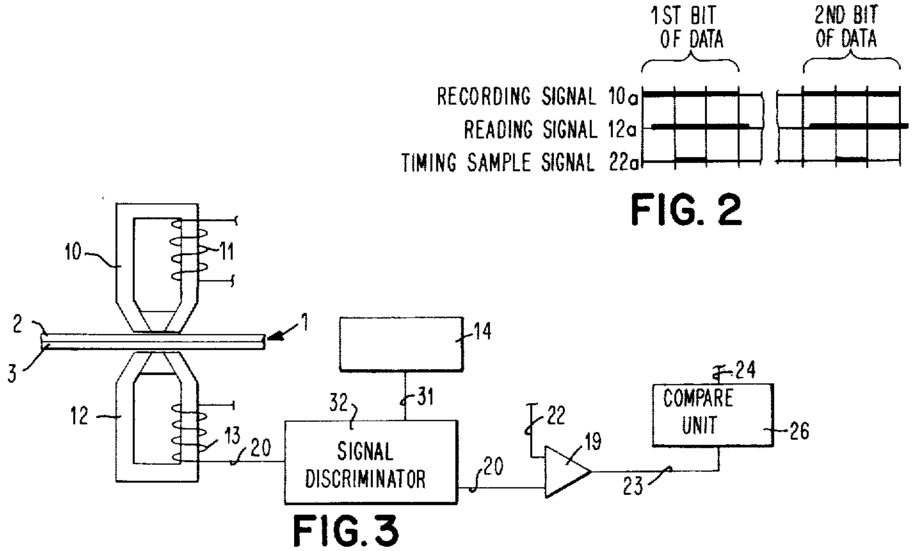
FIG. 2 is a time chart showing recording, reading and sample pulse timing relationships to an information bit.
FIG. 3 shows a portion of a modified arrangement of FIG. 1.

The embodiment in FIG. 3 is similar to the embodiment of FIG. 1 but shows, in addition, a signal level and frequency discrimination means 32 interposed in the line 20 connected to the reading head coil 13 and the switch 19. The means 32 has a control line 31 connected to the source of data signals 14. The discrimination means 32 is well known in the art and may be adjusted to accept or reject signals of any given amplitude. In the embodiment of FIG. 3, it may be appreciated that signals applied to the line 20, by means of the reading head coil 13, may or may not appear on the switch 19 depending upon what signal levels are desired to be accepted or rejected by the means 32.

Thus, by means of the present invention, a discrete bit of data can be recorded and the recorded information compared against the source information in the same operation and appropriate comparing control signals issued, during said operation, in response to the comparison to provide a control to continue or prevent the recording of the next bit of information. In addition, the discrimination means may be employed to detect signals of inferior level, as well as signals attributed to noise.

Figure 4:
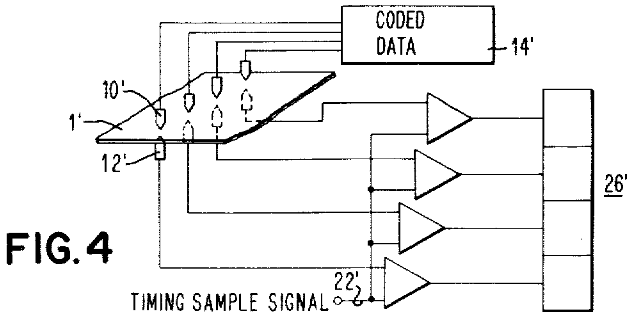
FIG. 4 shows a diagrammatic arrangement of a plurality of recording and reading heads.

FIG. 4 is a schematic representation showing an arrangement comprised of a plurailty of recording heads 10′ and a like number of reading heads 12′ placed in opposed relationship to the recording heads 10, the reading heads being connected individually to comparing means 26′ whereby comparison is effected with source data. Adjusting means, not shown, are provided to position the recording and reading heads relative to each other to present a gap through which the magnetizable medium 1′ is transported, in the manner earlier described, and upon which recording and reading operations may be concurrently performed. The recording heads 10′ are magnetically isolated from each other so as to avoid crosstalk. By virtue of the above arrangement and in accordance with the invention, different combinations of coded signals, each representing a different character, my be concurrently recorded, read and checked.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data processing system for effecting concurrent recording and reading operations upon a thin magnetizable medium such as a tape, or the like, the combination comprising:
   - a fixed recording means adapted for cooperation with one surface of said medium for recording thereon serially magnetic patterns in response to received data pattern signals,
   - means for moving said medium during the recording of said patterns, and
   - a fixed reading means disposed to cooperate with an opposed surface of said medium and in conjoint magnetic relationship both with said reading means and said opposed surface whereby each of said patterns being recorded on and through said medium to said opposed surface is concurrently read from said last-named surface.

2. In a data processing system for effecting concurrent recording and reading operations upon a thin magnetizable medium such as a tape, or the like, the combination comprising:
   - a fixed recording means adapted for cooperation with one surface of said medium for recording thereon serially magnetic patterns in response to received data pattern signals,
   - means for moving said medium during the recording of said patterns,
   - a fixed reading means disposed to cooperate with an opposed surface of said medium and in conjoint magnetic relationship both with said reading means and said opposed surface whereby each of said patterns being recorded on and through said medium to said opposed surface is concurrently read from said last-named surface, and
   - a comparing means connected to said fixed reading means and said data pattern signals to provide a comparison thereof concurrently with the recording of and reading of said pattern signals.

3. In a data processing system for effecting concurrent recording and reading operations upon a thin magnetizable medium such as a tape, or the like, the combination comprising:
   - a fixed recording means adapted for cooperation with one surface of said medium for recording thereon serially magnetic patterns in response to received data pattern signals,
   - means for moving said medium during the recording of said patterns,
   - a fixed reading means disposed to cooperate with an opposed surface of said medium and in conjoint magnetic relationship both with said reading means and said opposed surface whereby the pattern being recorded on and through said medium to said opposed surface is concurrently read from said last-named surface,
   - signal means adapted to issue timing and sampling signals coordinated with said data signals,
   - switching means responsive to said sampling signals for issuing related timed data and reading signals, and
   - a comparing means operable in response to the reception of said timed data and reading signals to effect a comparison thereof concurrently with the recording of and reading of said data signals.

4. The system, as in claim 3, furthetr characterized by the provision of signal level discrimination means interposed between said reading means and said comparing means and adapted to accept reading signals above a given signal level.

5. The system, as in claim 3, further characterized by the provision of frequency discrimination means interposed between said reading means and said comparing means and adapted to accept reading signals above a given frequency.

References Cited in the file of this patent

UNITED STATES PATENTS

| | | |
|---|---|---|
| 2,462,435 | Stanton | Feb. 22, 1949 |
| 2,658,114 | Buhrendorf | Nov. 3, 1953 |
| 2,737,646 | Muffly | Mar. 6, 1956 |
| 2,774,056 | Stafford et al. | Dec. 11, 1956 |
| 2,786,978 | Warner | Mar 26, 1957 |
| 2,789,026 | Nordyke | Apr. 16, 1957 |
| 2,813,927 | Johnson | Nov. 17, 1957 |
| 2,870,430 | Hancock | Jan. 20, 1959 |
| 2,871,464 | Wright et al. | Jan. 27, 1959 |
| 2,969,529 | Gilson | Jan. 24, 1961 |
| 3,015,810 | Latham et al. | Jan. 2, 1962 |

OTHER REFERENCES

"Digital Computer Components and Circuits," R. K. Richards, page 317, No. 1957.

UNITED STATES PATENT OFFICE

CERTIFICATE OF CORRECTION

Patent No. 3,096,511 July 2, 1963

Andrew Taras

It is hereby certified that error appears in the above numbered patent requiring correction and that the said Letters Patent should read as corrected below.

Column 4, line 20, for "furthetr" read -- further --; same column 4, after line 40, insert the following:

2,817,701 Johnson------------------Dec. 24, 1957 same column 4, line 48, for "No. 1957" read -- Nov. 1957 --.

Signed and sealed this 7th day of January 1964.

(SEAL)
Attest:

ERNEST W. SWIDER
Attesting Officer

EDWIN L. REYNOLDS
Acting Commissioner of Patents